United States Patent
Tsukiji

(10) Patent No.: US 12,422,281 B2
(45) Date of Patent: Sep. 23, 2025

(54) ESTIMATION DEVICE, APPARATUS INCLUDING ESTIMATION DEVICE, ESTIMATION METHOD, AND COMPUTER-READABLE MEDIUM

(71) Applicant: Asahi Kasei Microdevices Corporation, Tokyo (JP)

(72) Inventor: Hidekazu Tsukiji, Tokyo (JP)

(73) Assignee: Asahi Kasei Microdevices Corporation, Tokyo (JP)

(*) Notice: Subject to any disclaimer, the term of this patent is extended or adjusted under 35 U.S.C. 154(b) by 289 days.

(21) Appl. No.: 18/325,126

(22) Filed: May 30, 2023

(65) Prior Publication Data

US 2024/0006965 A1 Jan. 4, 2024

(30) Foreign Application Priority Data

Jun. 30, 2022 (JP) ................................ 2022-105375

(51) Int. Cl.
- *G01D 5/14* (2006.01)
- *G09F 9/30* (2006.01)
- *H02K 11/215* (2016.01)

(52) U.S. Cl.
CPC .............. *G01D 5/145* (2013.01); *G09F 9/301* (2013.01); *H02K 11/215* (2016.01)

(58) Field of Classification Search
CPC ................................ G01D 5/14; H02K 11/215
See application file for complete search history.

(56) References Cited

U.S. PATENT DOCUMENTS

| 9,297,634 B2 * | 3/2016 | Bartos | G01D 5/145 |
| 10,338,642 B2 * | 7/2019 | Furlong | G01R 33/07 |
| 2009/0224750 A1 * | 9/2009 | Hosek | G01B 7/003 |
| | | | 324/207.13 |

FOREIGN PATENT DOCUMENTS

| JP | S62115317 A | 5/1987 |
| JP | H0773575 A | 3/1995 |
| JP | H07333005 A | 12/1995 |
| JP | 2020148554 A | 9/2020 |
| JP | 6891254 B2 | 6/2021 |
| WO | 2009078048 A1 | 6/2009 |

* cited by examiner

Primary Examiner — Walter L Lindsay, Jr.
Assistant Examiner — Milton Gonzalez

(57) ABSTRACT

An estimation device may include an update unit. The update unit may correct the position of the second portion with respect to the first portion or the measured value of a first magnetic sensor, which is indicated by the new reference information, by comparing a predetermined first partial waveform in a first waveform for the first magnetic sensor, the first waveform indicating a change of a measured value in accordance with a position of the second portion with respect to the first portion, which is indicated by the new reference information, with a predetermined second partial waveform in a second waveform for a second magnetic sensor, the second waveform indicating the change of the measured value in accordance with the position of the second portion with respect to the first portion, which is indicated by the new reference information.

21 Claims, 11 Drawing Sheets

… (1)

ESTIMATION DEVICE, APPARATUS INCLUDING ESTIMATION DEVICE, ESTIMATION METHOD, AND COMPUTER-READABLE MEDIUM

The contents of the following patent application(s) are incorporated herein by reference: NO. 2022-105375 filed in JP on Jun. 30, 2022

BACKGROUND

1. Technical Field

The present invention relates to an estimation device, an apparatus including an estimation device, an estimation method, and a computer-readable medium.

2. Related Art

Patent Document 1 discloses that "a polynomial is approximated for a quasi-linear portion (a measurement range) of a sensor element signal of each sensor element 20-1, 20-2 or 20-3".

PRIOR ART DOCUMENT

Patent Document

Patent Document 1: Japanese Patent No. 6891254

DESCRIPTION OF EXEMPLARY EMBODIMENTS

Hereinafter, embodiments of the present invention will be described. However, the following embodiments are not for limiting the invention according to the claims. In addition, some combinations of features described in the embodiments may not be essential for the solving means of the invention.

Figure 1:
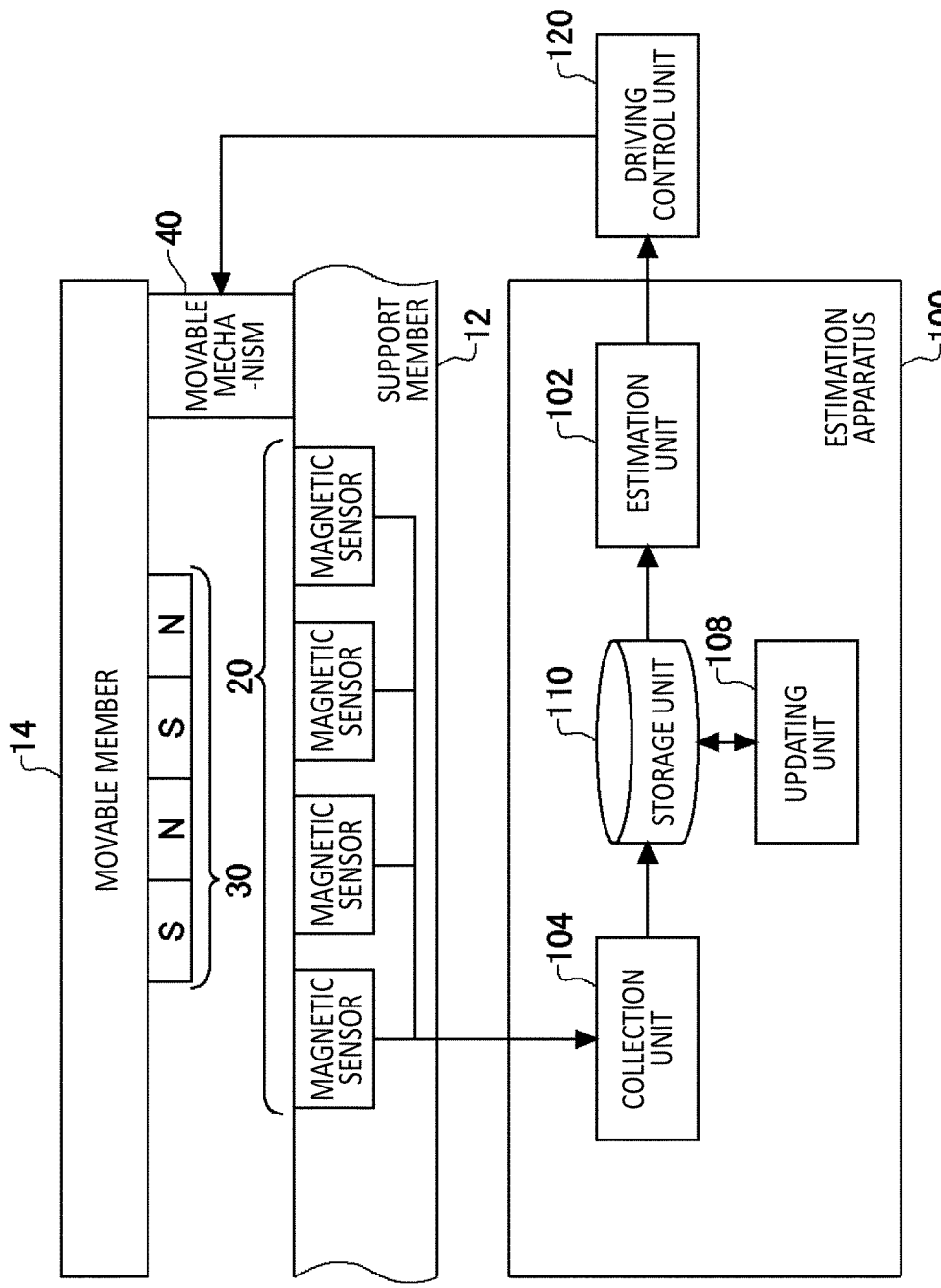
FIG. 1 is a diagram showing an example of a functional block of an apparatus according to the present embodiment.
Figure 2A:
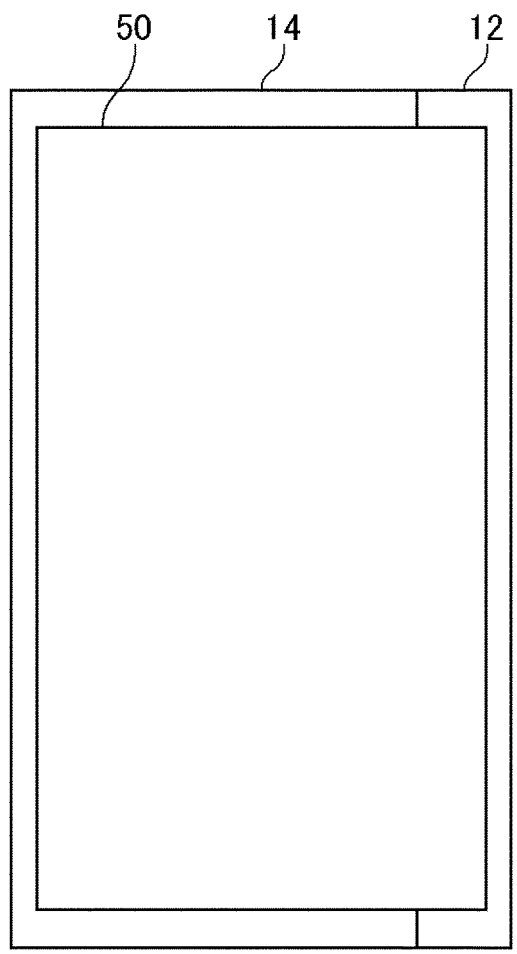
FIG. 2A is a diagram for describing a rollable smartphone.
Figure 2B:
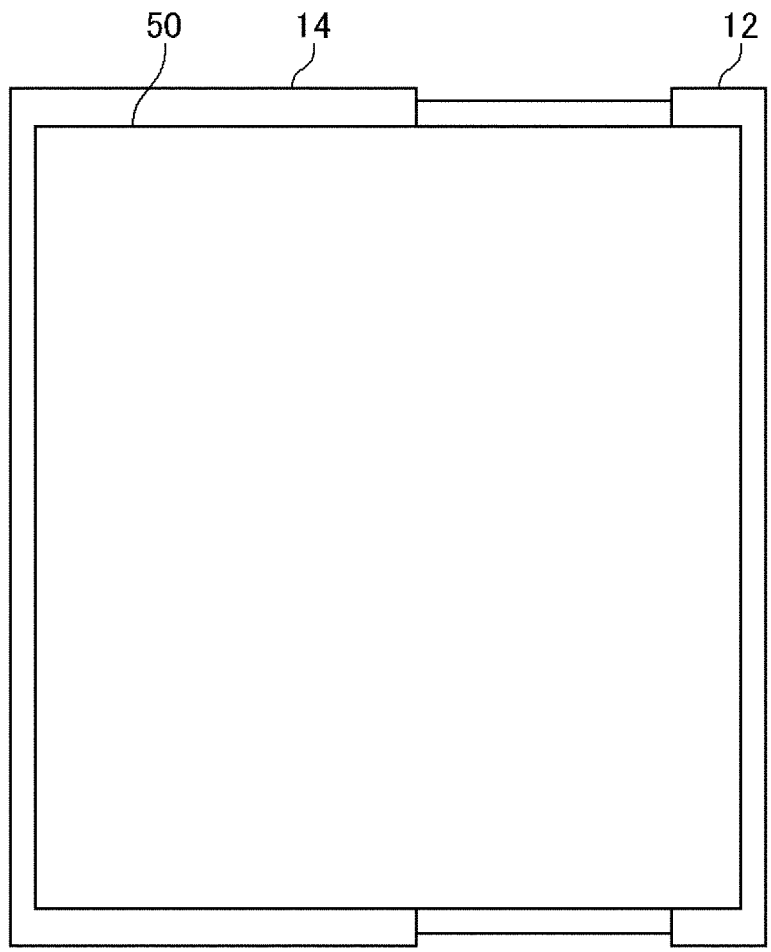
FIG. 2B is a diagram for describing the rollable smartphone.
Figure 2B:
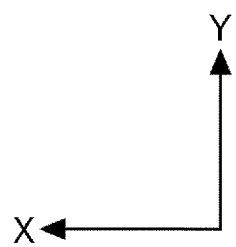

FIG. 1 is an example of a functional block of an apparatus 10 according to the present embodiment. FIG. 2A and FIG. 2B show examples of an external diagram when the apparatus 10 is a so-called rollable smartphone. The apparatus 10 includes a support member 12, a movable member 14, and a movable mechanism 40. The support member 12 supports the movable member 14 via the movable mechanism 40 such that a position of the movable member 14 is able to be changed with respect to the support member 12. The support member 12 may support the movable member 14 to be able to move along a predetermined direction via the movable mechanism 40. The support member 12 is an example of a first portion, and the movable member 14 is an example of a second portion.

The movable mechanism 40 may have a drive source that provides a driving force to move the movable member 14 with respect to the support member 12. The drive source may be an actuator such as an electrostatic actuator, a VCM (voice coil motor), or a piezo actuator.

The apparatus 10 may be, for example, a rollable smartphone in which a display screen of a display expands and contracts as shown in FIG. 2A and FIG. 2B. The support member 12 and the movable member 14 may constitute a display unit. The movable member 14 may move with respect to the support member 12 along a direction of an X axis from a first state shown in FIG. 2A to a second state shown in FIG. 2B. In this manner, a width of a display screen 50 in an X direction increases or decreases. The display screen 50 may be, for example, a thin display such as an organic EL display that is able to be wound around a rotation axis along a Y axis.

The apparatus 10 may be a zoom mechanism included in an image capturing device. The movable member 14 may include a zoom lens and a holding frame which holds the zoom lens, and the support member 12 may include a guide shaft that supports the holding frame, which holds the zoom lens, to be able to move in an optical axis direction.

Returning to FIG. 1, the apparatus 10 further includes a plurality of magnetic sensors 20 and a magnet unit 30. The magnetic sensor 20 measures a magnetic field at a position where the magnetic sensor 20 is provided, and outputs a measured value (for example, a voltage or a current) in accordance with the magnetic field. The magnetic sensor 20 may be a Hall element. The present embodiment describes an example in which the apparatus 10 includes four magnetic sensors 20. However, any number of magnetic sensors 20 that are included in the apparatus 10 may be used, and the apparatus 10 only needs to have at least one magnetic sensor 20. The apparatus 10 only needs to include a number of magnetic sensors 20 necessary to estimate the position of the movable member 14 with respect to the support member 12 over an entire range of movement. The magnetic sensor 20 may output the measured value in accordance with the magnetic field in each of directions of the X axis, the Y axis, and a Z axis. However, in order to simplify the description, the present embodiment provides a description by focusing on the measured value in accordance with the magnetic field in a direction of one axis of any of the X axis, the Y axis, and the Z axis, for example, the X axis.

The magnet unit 30 provides the magnetic field to each of the plurality of magnetic sensors 20. The magnet unit 30 may have an S pole and an N pole alternately arranged along a predetermined direction. The plurality of magnetic sensors 20 are provided in the support member 12. The plurality of magnetic sensors 20 may be provided in the support member 12 along the predetermined direction, when the movable member 14 moves with respect to the support member 12 along the predetermined direction. The plurality of magnetic sensors 20 may be provided in the support member 12 at an equal interval along the predetermined direction.

The apparatus 10 further includes an estimation device 100 and a drive control unit 120. The estimation device 100 estimates the position of the movable member 14 with respect to the support member 12 based on the measured value of each of the plurality of magnetic sensors 20. The drive control unit 120 may control the movable mechanism 40 such that the position of the movable member 14 with respect to the support member 12 comes to a target position, based on the position of the movable member 14 with respect to the support member 12, which is estimated by the estimation device 100.

The plurality of magnetic sensors 20 measure surrounding magnetic fields and output the measured values indicating magnitudes of the surrounding magnetic fields. The magnetic sensor 20 may include a Hall element. The movable member 14 moving with respect to the support member 12 changes the surrounding magnetic field of each of the plurality of magnetic sensors 20. A change of the measured value of each of the plurality of magnetic sensors 20 has a correlation with a change of the position of the movable member 14 with respect to the support member 12. Accordingly, when the relationship between the measured value of each of the plurality of magnetic sensors 20 and the position of the movable member 14 with respect to the support member 12 is known in advance, the estimation device 100 can estimate the position of the movable member 14 with respect to the support member 12, from the measured value which is measured by each of the plurality of magnetic sensors 20.

The estimation device 100 includes an estimation unit 102, a collection unit 104, an update unit 108, and a storage unit 110. The storage unit 110 stores reference information indicating the measured value in accordance with the position of the movable member 14 with respect to the support member 12. The reference information may indicate a combination of the measured value of each of the plurality of magnetic sensors 20 in association with the position of the movable member 14 with respect to the support member 12. The reference information may indicate the measured values of the plurality of magnetic sensors 20 in accordance with the position of the movable member 14 with respect to the support member 12 in a predetermined range of movement. The reference information may indicate a combination of the measured value of each of the plurality of magnetic sensors 20 in accordance with the position of the movable member 14 with respect to the support member 12 in the predetermined range of movement.

The collection unit 104 may sequentially collect the measured value indicating the magnitude of the magnetic field measured by each of the plurality of magnetic sensors 20 for each predetermined period, and store the collected measured value in the storage unit 110 as update information. The collection unit 104 may sequentially collect the measured value indicating the magnitude of the magnetic field measured by each of the plurality of magnetic sensors 20, and a timestamp indicating a time measured by each of the plurality of magnetic sensors 20, and store the collected measured value and timestamp in the storage unit 110 as the update information. The estimation unit 102 estimates the position of the movable member 14 with respect to the support member 12 based on the latest measured value measured by each of the plurality of magnetic sensors 20 and the reference information which are stored in the storage unit 110.

Figure 3:
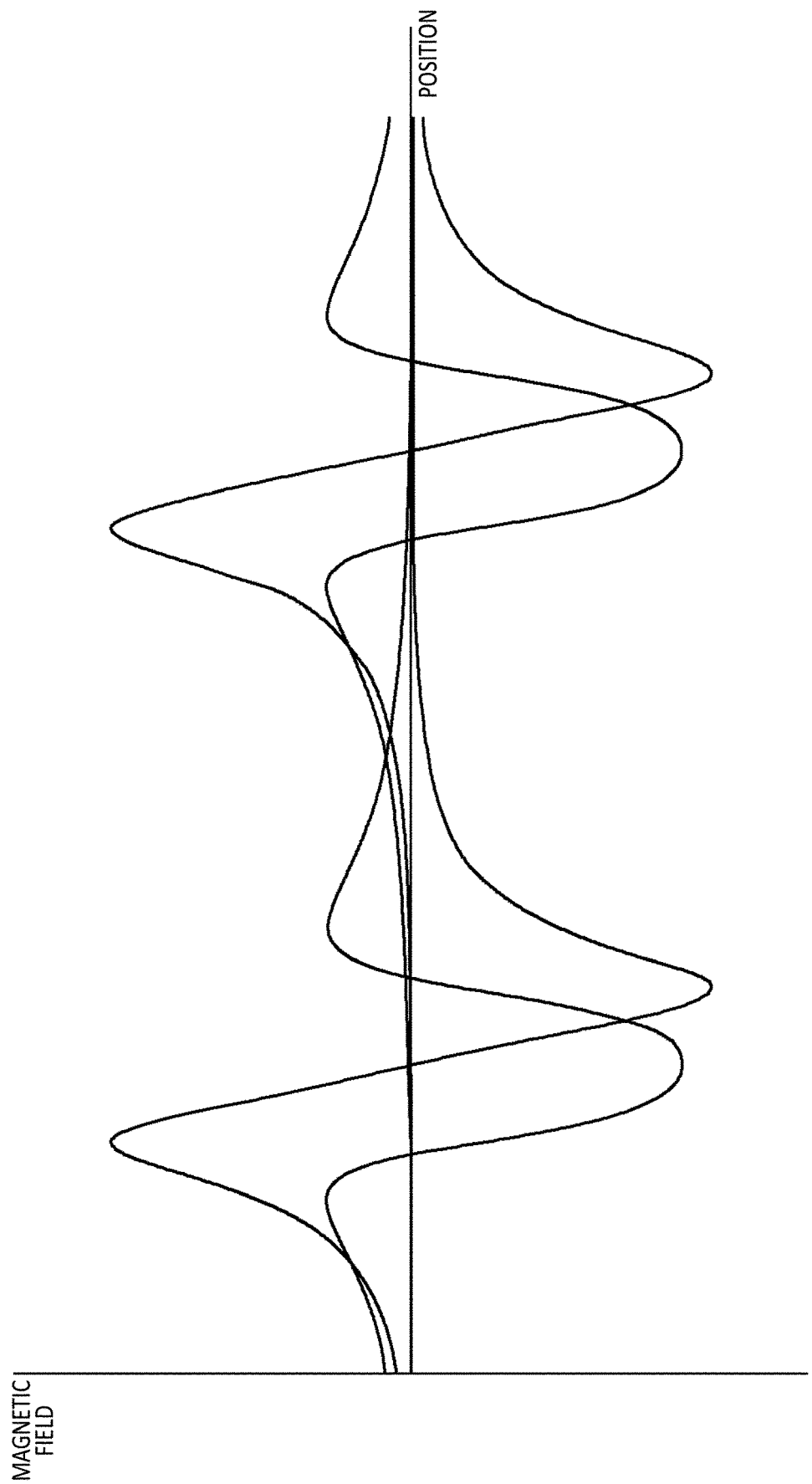
FIG. 3 is a diagram showing an example of reference information.

FIG. 3 shows an example of reference information. The reference information shown in FIG. 3 indicates the relationship between the position of the movable member 14 with respect to the support member 12, and the measured value of each of the four magnetic sensors 20, when the movable member 14 moves with respect to the support member 12 along a predetermined direction.

The reference information may be generated before a factory shipment. The drive control unit 120 acquires the measured value of each of the plurality of the magnetic sensors 20, at an equal interval, while controlling the movable mechanism 40 to move the movable member 14 with respect to the support member 12 from one end to an opposite end in a predetermined range of movement, at an equal interval. The drive control unit 120 may acquire the measured value of each of the plurality of the magnetic sensors 20, at an equal interval, while controlling the movable mechanism 40 to move the movable member 14 with respect to the support member 12 from the one end to the opposite end in the predetermined range of movement, at an equal interval and a constant speed. The reference information may be generated based on each measured value obtained by repeating these operations multiple times, and an amount of the movement from the one end in the predetermined range of movement.

The reference information is generated and stored in the storage unit 110 before the factory shipment. However, the correlation between the magnitude of the magnetic field which is measured by the magnetic sensor 20, and the position of the movable member 14 with respect to the support member 12, may change, by a disturbance such as a difference in magnitude of the magnetic field in an environment in which the apparatus 10 is used.

Therefore, it is desirable that calibration is performed for the reference information, even after the factory shipment, based on actual measured values of the plurality of magnetic sensors 20 in accordance with the position of the movable member 14 with respect to the support member 12. As a calibrating method, a method is conceivable for updating the reference information based on the measured values in accordance with the times which are measured by the plurality of magnetic sensors 20 while the movable member 14 is caused to move with respect to the support member 12 within a predetermined range of movement in a predetermined operation pattern, over a predetermined period. When the movable member 14 moves in the predetermined operation pattern, the position of the movable member 14 can be estimated from a time after a start of the movement. For example, when the movable member 14 moves from the one end to the opposite end in the predetermined range of movement at a constant speed, the time after the start of the movement is proportional to a movement distance of the movable member 14, and thus the position of the movable member 14 can be estimated from the measured value in accordance with the time.

However, even in a case where the movable member 14 is caused to move with respect to the support member 12 within a predetermined range of movement in a predetermined operation pattern, over a predetermined period, there exists a period during which the movable member 14 cannot move at a constant speed, immediately after the start of the movement of the movable member 14, immediately before an end of the movement, and the like. When the position of the movable member 14 is estimated from the measured value in accordance with a measurement time in such a non-constant speed section, an error may occur in estimating the position of the movable member 14 and the calibration may not be able to be performed for the reference information with a high precision.

Figure 4:
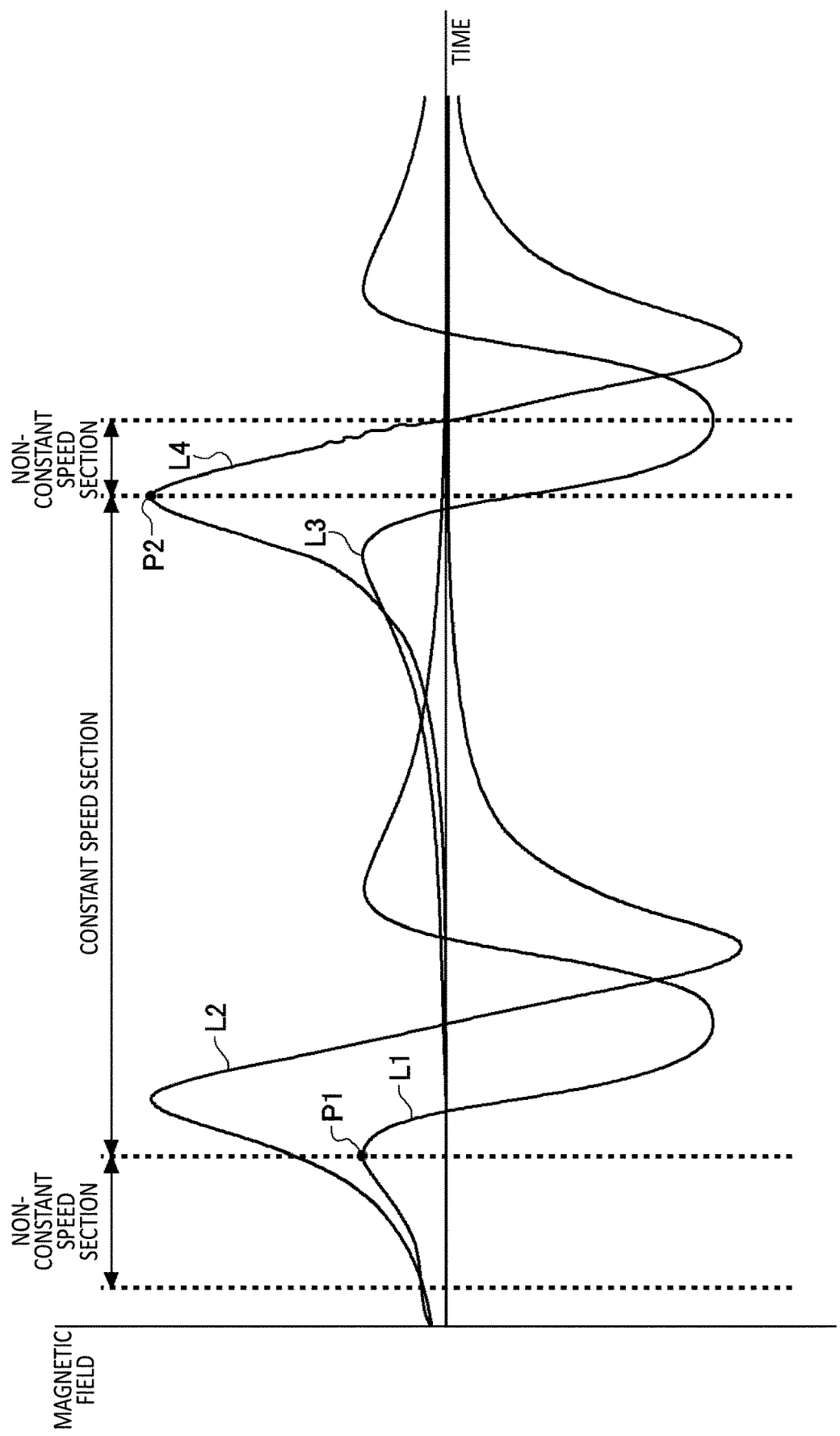
FIG. 4 is a diagram showing an example of a waveform showing a change of a measured value in accordance with a measurement time.

FIG. 4 shows an example of a waveform showing temporal changes of measured values measured by the plurality of magnetic sensors 20 while the movable member 14 is driven to move within a predetermined range of movement at a constant speed. Even when the movable member 14 is caused to move at the constant speed, as shown in FIG. 4, there exists a non-constant speed section during which the movable member 14 does not move at the constant speed, immediately after the movement of the movable member 14, immediately before the stop, and the like. In addition, the operation pattern may be intentionally designed to move the movable member 14 at a non-constant speed in a period immediately after the movement of the movable member 14, and immediately before the stop.

Here, in detecting the position of the movable member 14 moving along a predetermined direction, the plurality of magnetic sensors 20 are arranged along the predetermined direction. When the plurality of magnetic sensors 20 are arrayed in this way, it is highly probable that there exists a certain magnetic sensor 20 in which the waveform indicating the temporal change of the measured value, is able to be considered to have an analogous relationship with the waveform indicating the temporal change of the measured value measured by another magnetic sensor 20. That is, it is highly probable that there exists a certain magnetic sensor 20 in which the waveform indicating the temporal change of the measured value, is able to be considered to have a similarity with the waveform indicating the temporal change of the measured value measured by another magnetic sensor 20.

Therefore, in the present embodiment, by focusing on such a similarity between the waveforms indicating the temporal changes of the measured values, the update unit 108 corrects the measured value in accordance with the time or the position of the movable member 14, generate new reference information, and update current reference information with the new reference information. Alternatively, focusing on the waveform indicating the change of the measured value in accordance with the position, the update unit 108 generates the new reference information by the measured value in accordance with the measurement time, and then corrects the measured value or the position of the movable member 14, which is indicated by the new reference information, and then update the current reference information by the new reference information.

The update unit 108 is configured to correct the position of the movable member 14 with respect to the support member 12 or the measured value of a predetermined first magnetic sensor, which is indicated by the new reference information, by comparing a predetermined first partial waveform in a first waveform for the first magnetic sensor among the plurality of magnetic sensors 20, the first waveform indicating the change of the measured value in accordance with the position of the movable member 14 with respect to the support member 12, which is indicated by the new reference information, with a predetermined second partial waveform in a second waveform for a predetermined second magnetic sensor among the plurality of magnetic sensors 20, the second waveform indicating the change of the measured value in accordance with the position of the movable member 14 with respect to the support member 12, which is indicated by the new reference information. The update unit 108 may correct the position of the movable member 14 with respect to the support member 12 or the measured value of the first magnetic sensor, which is indicated by the new reference information, such that the first partial waveform has a similarity with the second partial waveform.

The update unit 108 may correct the position of the movable member 14 with respect to the support member 12 or the measured value of a third magnetic sensor, which is indicated by the new reference information, by comparing, when a third waveform for the third magnetic sensor among the plurality of magnetic sensors 20 is line-symmetrical in a first range around a peak of the third waveform, halves of the third waveform around the peak in a second range which is wider than the first range around the peak of the third waveform, the third waveform indicating the change of the measured value in accordance with the position of the movable member 14 with respect to the support member 12, which is indicated by the new reference information. The update unit 108 may correct the position of the second portion with respect to the first portion or the measured value of the third magnetic sensor, which is indicated by the new reference information, such that the third waveform is line-symmetrical in the second range, when the third waveform is line-symmetrical in the first range around the peak of the third waveform.

The update unit 108 may correct a measured value in accordance with a time measured in a predetermined calibration measurement period by the predetermined first magnetic sensor, and then generate the new reference information, by using the predetermined first partial waveform in the first waveform indicating a change of a measured value in accordance with a time measured in a first period by the first magnetic sensor among the plurality of magnetic sensors 20, and the predetermined second partial waveform in the second waveform indicating a change of the measured value in accordance with the time measured in the calibration measurement period by the predetermined second magnetic sensor among the plurality of magnetic sensors 20. The update unit 108 may correct the measured value in accordance with the time measured in the calibration measurement period by the first magnetic sensor, such that the first partial waveform is substituted for the second partial waveform which is enlarged or reduced by a magnification determined based on the reference information and of which a position is shifted by a predetermined amount; and then generate the new reference information.

The update unit 108 may correct the measured value in accordance with the time measured in the predetermined calibration measurement period by the predetermined first magnetic sensor, and then generate the new reference information, by comparing the predetermined first partial waveform in the first waveform indicating the change of the measured value in accordance with the time measured in the first period by the first magnetic sensor among the plurality of magnetic sensors 20, with the predetermined second partial waveform in the second waveform indicating the change of the measured value in accordance with the time measured in the calibration measurement period by the predetermined second magnetic sensor among the plurality of magnetic sensors 20. The update unit 108 may correct the measured value in accordance with the time measured in the calibration measurement period by the first magnetic sensor such that the first partial waveform has a similarity with the second partial waveform; and then generate the new reference information.

The update unit 108 may correct the measured value in accordance with the time measured in the calibration measurement period by the third magnetic sensor, by comparing, when the third waveform is line-symmetrical in the first range around the peak of the third waveform, halves of the third waveform around the peak in the second range which is wider than the first range around the peak of the third waveform, the third waveform indicating the change of the measured value in accordance with the time measured in the calibration measurement period by the third magnetic sensor among the plurality of magnetic sensors. The update unit 108 may correct the measured value in accordance with the time measured in the calibration measurement period by the third magnetic sensor, such that the third waveform is line-symmetrical in the second range, when the third waveform is line-symmetrical in the first range around the peak of the third waveform. The first range and the second range may be predetermined ranges.

In the example shown in FIG. 4, it can be considered that: a waveform L1 indicating a temporal change of a measured value by a magnetic sensor 20A has a similarity with a waveform L3 indicating a temporal change of a measured value by a magnetic sensor 20C; and a waveform L2 indicating a temporal change of a measured value by a magnetic sensor 20B has a similarity with a waveform L4 indicating a temporal change of a measured value by a magnetic sensor 20D.

Figure 5:
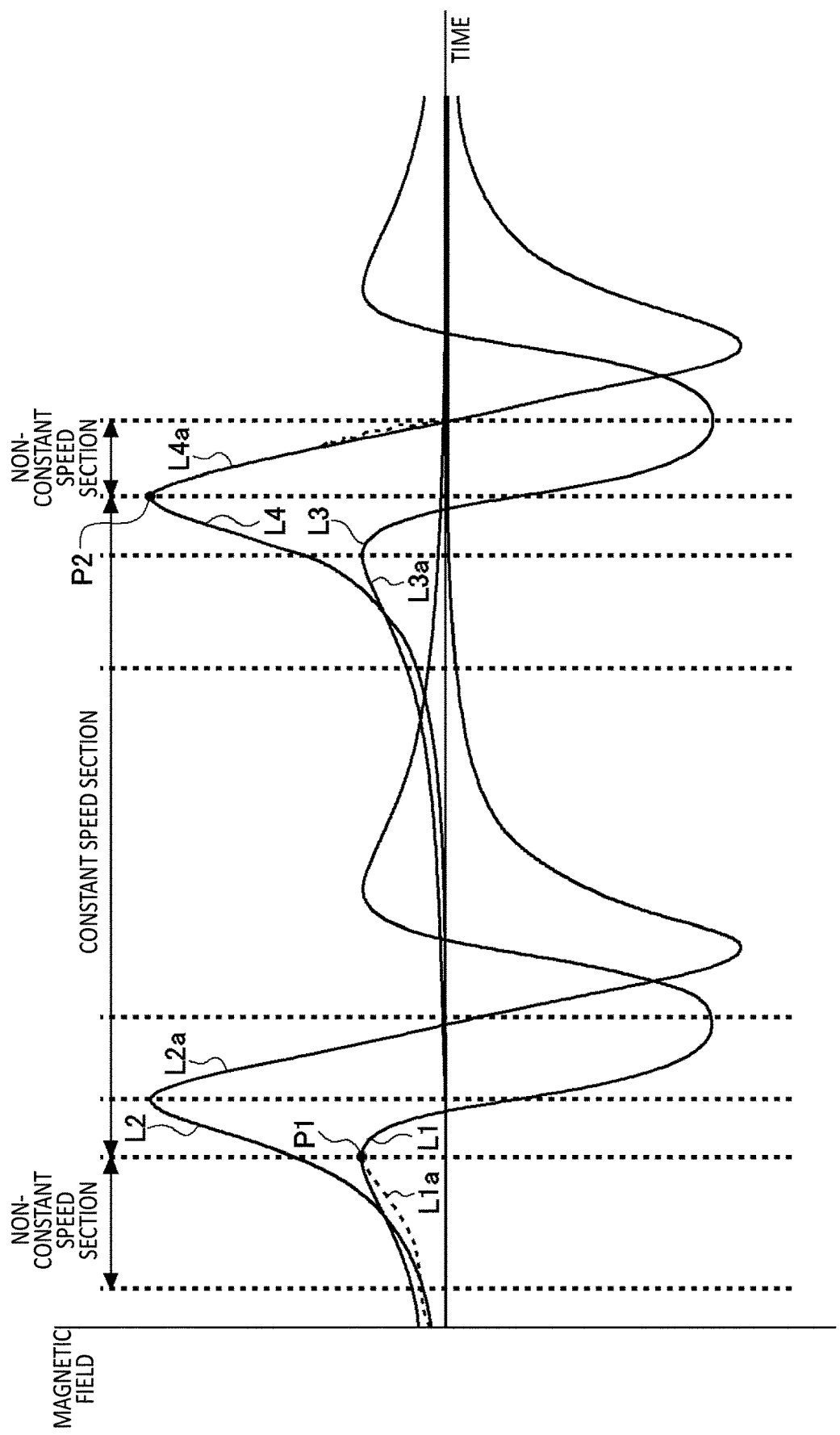
FIG. 5 is a diagram for describing a correction method for the measured value in accordance with the measurement time.

Therefore, the update unit 108 may correct the measured value of the magnetic sensor 20A or the position of the movable member 14 with respect to the support member 12 such that a predetermined partial waveform L1a in the waveform L1 indicating the change of the measured value in accordance with the time measured in the calibration measurement period by the magnetic sensor 20A, has a similarity with a predetermined partial waveform L3a in the waveform L3 indicating the change of the measured value in accordance with the time measured in the calibration measurement period by the magnetic sensor 20C, as shown in FIG. 5. In addition, the update unit 108 may correct the measured value of the magnetic sensor 20D or the position of the movable member 14 with respect to the support member 12 such that a predetermined partial waveform L4a in the waveform L4 indicating the change in accordance with the time measured in the calibration measurement period by the magnetic sensor 20D, has a similarity with a predetermined partial waveform L2a in the waveform L2 indicating the change of the measured value in accordance with the time measured in the calibration measurement period by the magnetic sensor 20B. Next, the update unit 108 may generate the new reference information based on the corrected measured value in accordance with the time measured in the calibration measurement period by each of the plurality of magnetic sensors 20, and the corrected position of the movable member 14 with respect to the support member 12; and update the reference information based on the new reference information.

The update unit 108 may correct the measured value of the magnetic sensor 20 as a correction target or the position of the movable member 14 with respect to the support member 12 such that a waveform of the correction target has a similarity with a waveform of a reference target, by enlarging or reducing the waveform of the reference target according to the waveform of the correction target, or offsetting the waveform of the reference target by raising or lowering a peak of the waveform of the reference target according to the waveform of the correction target.

When the movable member 14 is assumed to move at a constant speed, it can be considered that the waveform indicating the change in accordance with the time for one magnetic sensor 20 is line-symmetrical around the peak of the waveform.

Figure 6:
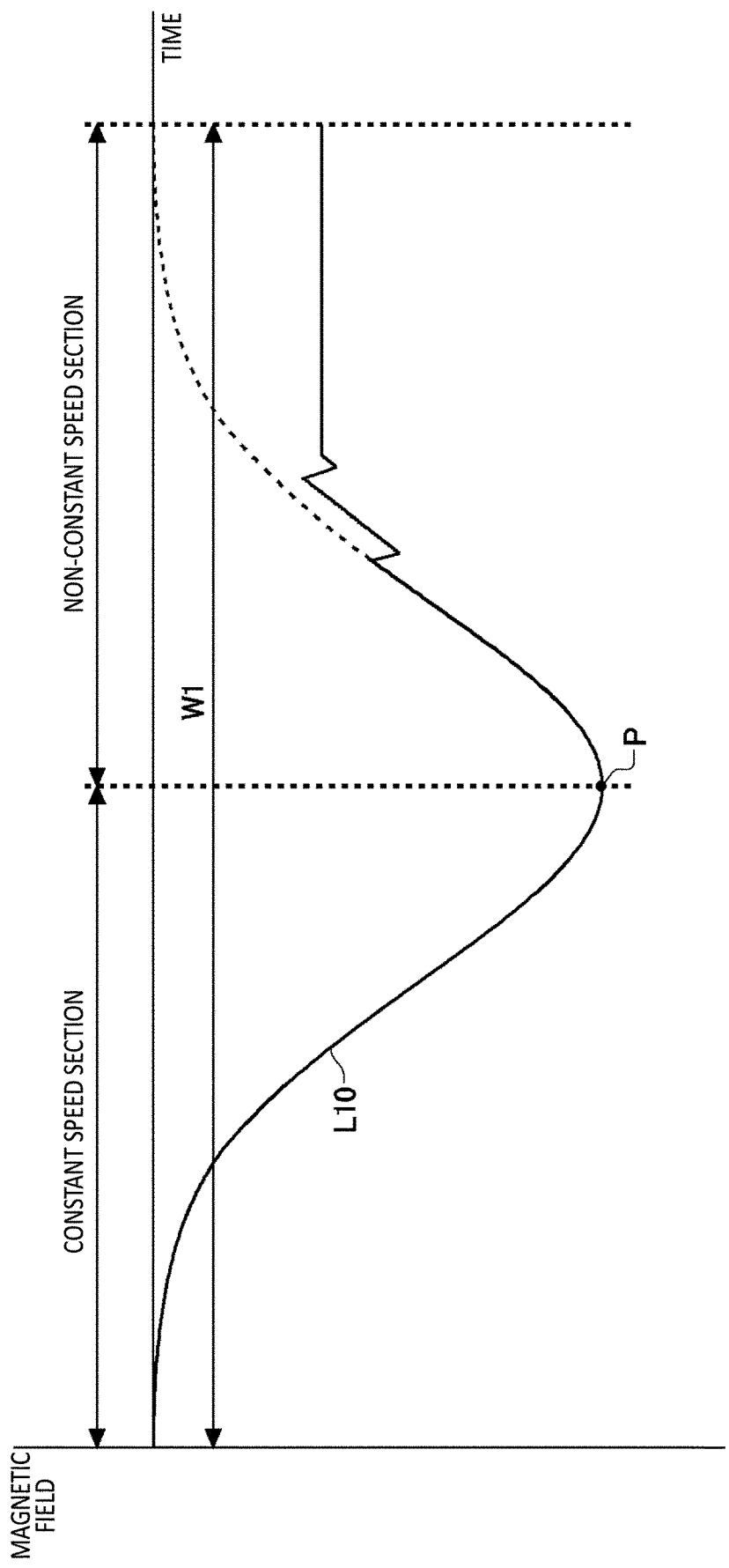
FIG. 6 is a diagram for describing the correction method for the measured value in accordance with the measurement time.

The update unit 108 may correct the position of the movable member 14 with respect to the support member 12 or the measured value of the magnetic sensor 20C, which is indicated by the new reference information, by comparing, in a predetermined range W1 around a peak P of a waveform L10 for the magnetic sensor 20C, halves of the third waveform L10 around the peak P, the waveform L10 indicating the change of the measured value in accordance with the position of the movable member 14 with respect to the support member 12, which is indicated by the new reference information, as shown in FIG. 6. For example, the update unit 108 may correct the measured value measured by the magnetic sensor 20C or the position of the movable member 14 with respect to the support member 12 such that the waveform L10 is line-symmetrical around the peak P in the predetermined width W1 around the peak of the waveform L10 indicating the change of the magnetic field in accordance with the time for the magnetic sensor 20C; and then, update the reference information.

When the waveform L10 indicating the change of the magnetic field in accordance with the time for the magnetic sensor 20C is not line-symmetrical in a predetermined width around the peak P of the waveform L10, the update unit 108 may correct the position of the movable member 14 with respect to the support member 12 or the measured value of the magnetic sensor 20C, which is indicated by the new reference information, by comparing a waveform in a predetermined range for the magnetic sensor 20C indicating the change of the measured value in accordance with the position of the movable member 14 with respect to the support member 12, which is indicated by the new reference information, with a waveform based on a predetermined fit function indicating the change of the measured value in accordance with the position of the movable member 14 with respect to the support member 12.

The update unit 108 may correct the position of the movable member 14 with respect to the support member 12 or the measured value of the magnetic sensor 20C, which is indicated by the new reference information, such that the waveform in the predetermined range for the magnetic sensor 20C indicating the change of the measured value in accordance with the position of the movable member 14 with respect to the support member 12, which is indicated by the new reference information, matches the waveform based on the predetermined fit function indicating the change of the measured value in accordance with the position of the movable member 14 with respect to the support member 12.

Figure 7:
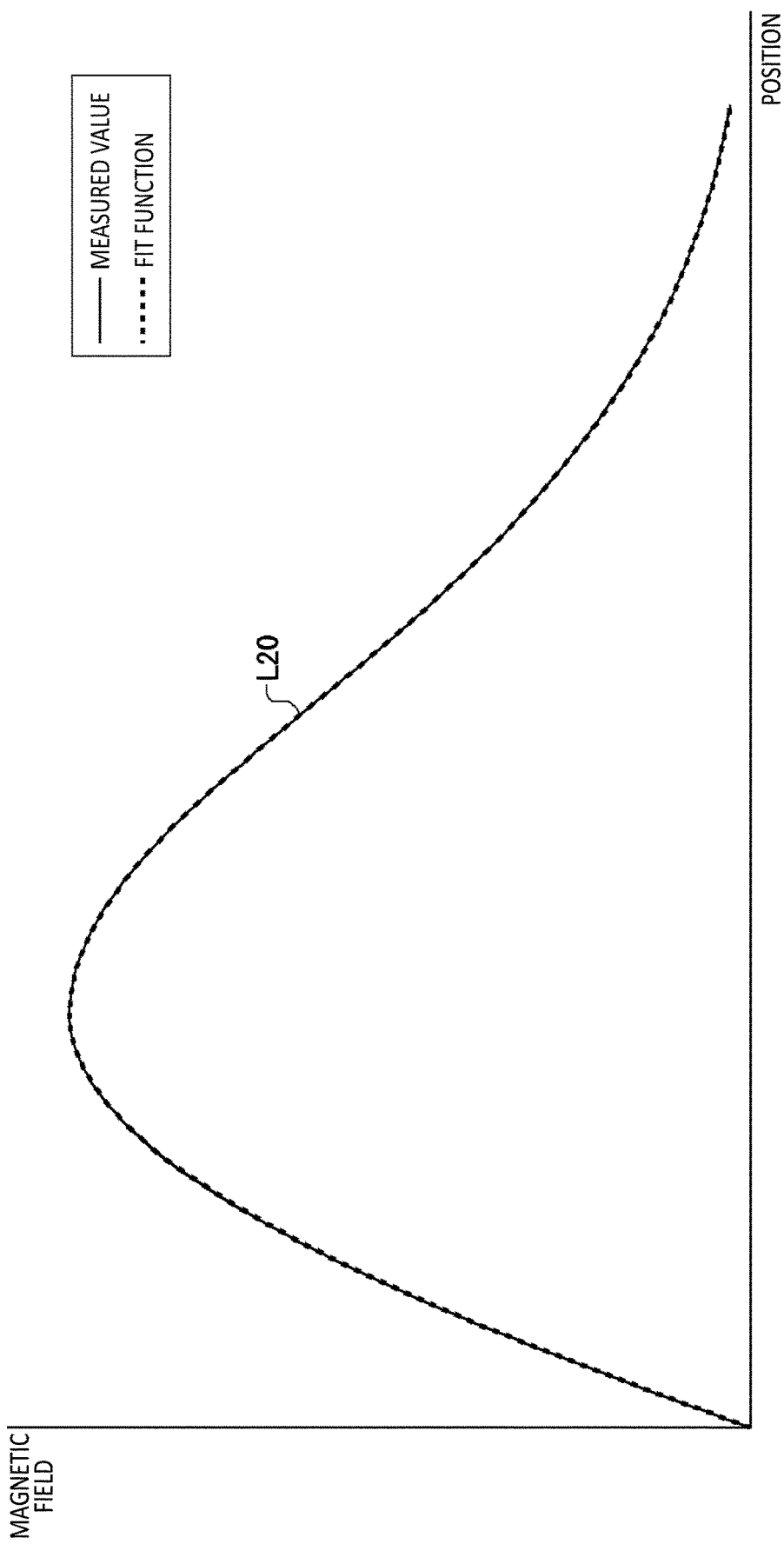
FIG. 7 is a diagram for describing a fit function.

FIG. 7 shows an example of the waveform L20 indicating a change in a predetermined range of the measured value of the magnetic sensor 20C in accordance with the position of the movable member 14 with respect to the support member 12. A fit function of the waveform L20 can be defined by the following expression (1).

$$f(x)=a(x-\bar{x})\exp(-(x-\bar{x})^2/b) \qquad \text{Expression 1}$$

In the expression, x is the position of the movable member 14 with respect to the support member 12. The x-bar is a position of a zero point. That is, the x-bar is an initial position of the movable member 14 with respect to the support member 12. The sign a represents a gradient of the change of the magnetic field which is measured by the magnetic sensor 20C when the magnet 30 is near a position closest to the magnetic sensor 20C. The sign b represents an attenuation rate of the magnetic field measured by the magnetic sensor 20C when the magnet 30 is separated from the magnetic sensor 20C. The update unit 108 may shift the waveform based on the fit function such that a peak of the waveform based on the fit function which is defined by the expression (1) matches the peak of the waveform indicating the change of the measured value in accordance with the position of the movable member 14 with respect to the support member 12; and then, correct the position of the movable member 14 with respect to the support member 12 or the measured value of the magnetic sensor 20C, which is indicated by the new reference information, such that the waveform based on the fit function is matched.

The fit function may be defined as $h(x)=g(x)\exp(-f(x))$. The $g(x)$ may be a constant, and the $f(x)$ may represent a function in which $f(x_p)=0$ at a peak position $x_p$ and which is convex down near the peak position $x_p$. The $g(x)$ is a polynomial, and the $h(x)$ may represent a function in which $dh/dx(x_p)=0$ near the peak position $x_p$.

The update unit 108 may generate new reference information based on the measured value in accordance with the time measured in the calibration measurement period by each of the plurality of magnetic sensors 20. That is, on the assumption that the movable member 14 moves over the entire range of movement at a constant speed, the update unit 108 may generate the new reference information, by converting the measured value in accordance with the time into the measured value in accordance with the position of the movable member 14 with respect to the support member 12. The update unit 108 may perform the conversion into the position of the movable member 14 with respect to the support member 12 by multiplying the time after the start of movement of the movable member 14 by a coefficient in accordance with a movement speed of the movable member 14. Next, the update unit 108 corrects the measured value of the magnetic sensor 20 as the correction target, or the position of the movable member 14 with respect to the support member 12, which is indicated by the new reference information, such that the predetermined first partial waveform corresponding to the non-constant speed section in the first waveform for the magnetic sensor 20 as the correction target, the first waveform indicating the change of the measured value in accordance with the position of the movable member 14 with respect to the support member 12, which is indicated by the new reference information, has a similarity with the predetermined second partial waveform in the second waveform for the magnetic sensor 20 as the reference target, the second waveform indicating the change of the measured value in accordance with the position of the movable member 14 with respect to the support member 12, which is indicated by the new reference information; and then updates the current reference information based on the corrected new reference information. The update unit 108 may update the current reference information by substituting the new reference information for the current reference information.

The predetermined partial waveform of the correction target may be for a part corresponding to the measured value which is measured by the magnetic sensor 20 as the correction target in a section in which the movable member 14 moves at a non-constant speed. The section in which the movable member 14 moves at the non-constant speed may be a section in which the movable member 14 reaches a predetermined speed after the start of the movement, and a section in which the movable member 14 stops after a start of deceleration from a predetermined speed. A predetermined operation pattern may be a pattern in which the movable member 14 is caused to move with respect to the support member 12 along a predetermined direction at a constant speed, from one end toward an opposite end in a predetermined range of movement. In this case, the magnetic sensor 20 as the correction target may be the magnetic sensor 20 arrayed at each of one end and an opposite end of the plurality of magnetic sensors 20. The magnetic sensor 20 as the reference target may be the magnetic sensor 20 other than the magnetic sensor 20 arrayed at each of the one end and the opposite end of the plurality of magnetic sensors 20. As shown in FIG. 4, the partial waveform as the correction target may be a partial waveform on an outside (the non-constant speed section) of a part between (a constant speed section) a peak P1 of the waveform indicating the change of the measured value of the magnetic sensor 20A at the one end, and a peak P2 of the waveform indicating the change of the measured value of the magnetic sensor 20D at the opposite end.

Figure 8:
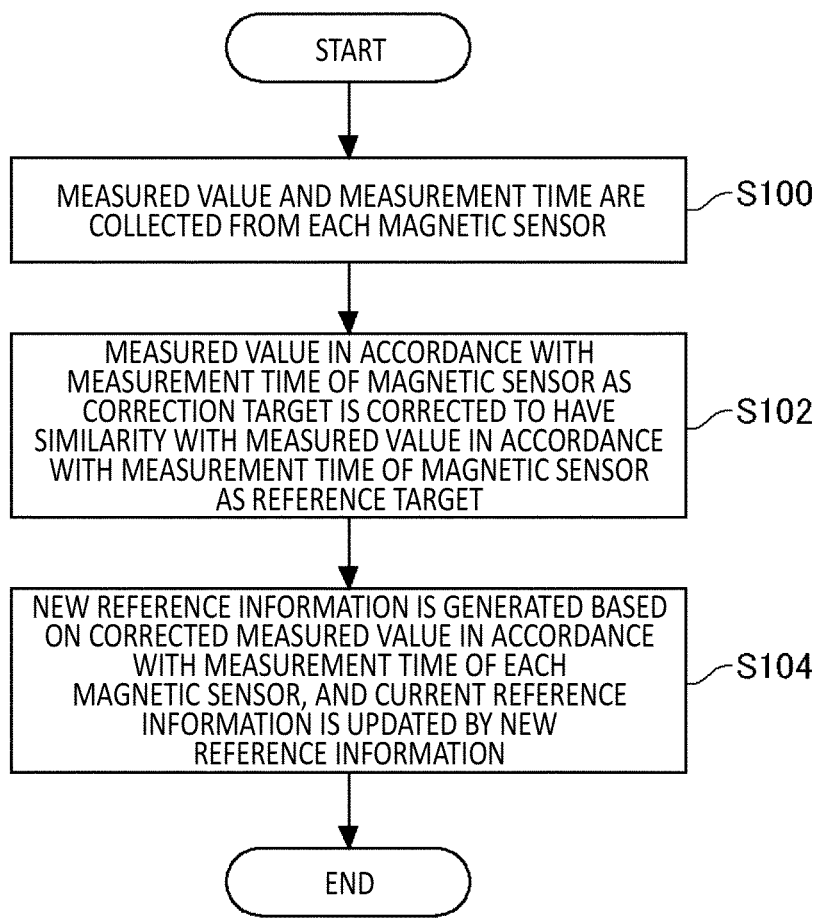
FIG. 8 is a flowchart showing an example of an update procedure of the reference information.

FIG. 8 is a flowchart showing an example of an update procedure of the reference information.

The collection unit 104 collects the measured value and the measurement time from each of the plurality of magnetic sensors 20, while the drive control unit 120 controls the movable mechanism 40, to move the movable member 14 with respect to the support member 12 along a predetermined direction at a constant speed, from one end to an opposite end in a predetermined range of movement in the calibration measurement period (S100).

The update unit 108 corrects the measured value in accordance with the measurement time of the magnetic sensor 20 as a predetermined correction target, to have a similarity with the measured value in accordance with the measurement time of the magnetic sensor 20 as a predetermined reference target (S102). The update unit 108 generates the new reference information and updates the current reference information by the new reference information, by converting the corrected measured value in accordance with the measurement time of each magnetic sensor 20, into the measured value in accordance with the position of the movable member 14 with respect to the support member 12 (S104).

The above processing corrects the measured value measured by the magnetic sensor 20 in the period during which the movable member 14 moves at a non-constant speed. In this manner, the reference information can be updated with a higher precision.

Figure 9:
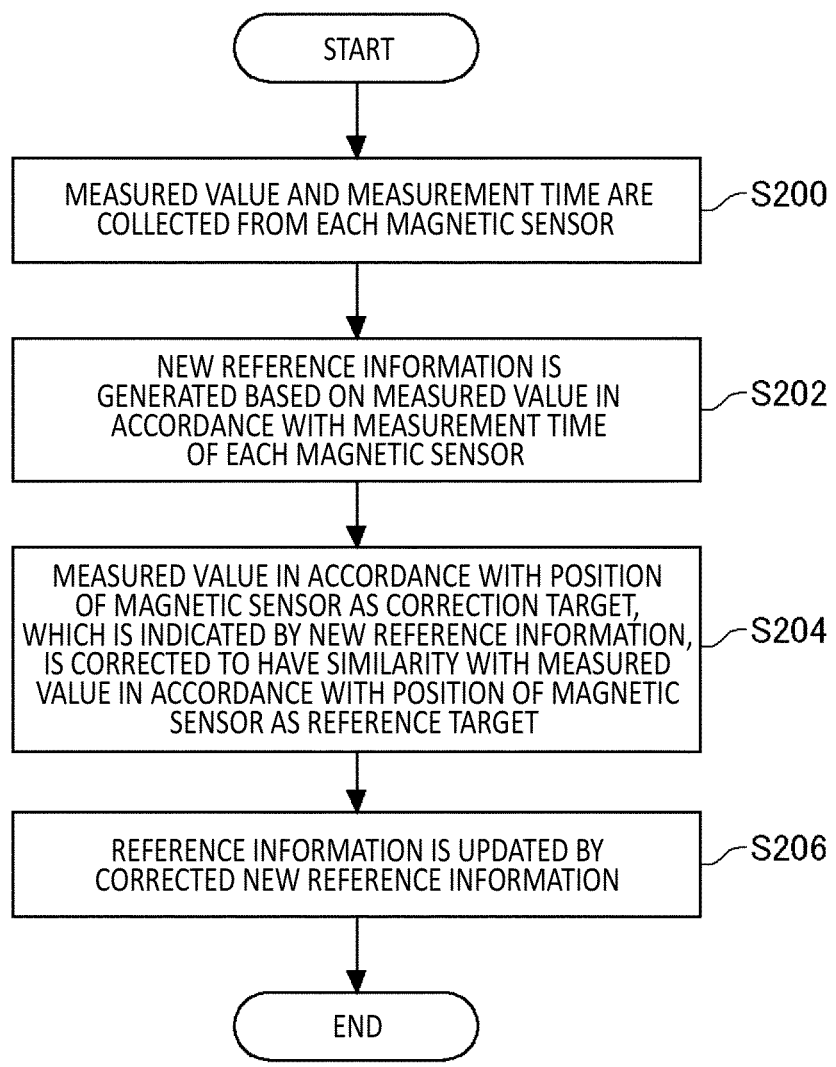
FIG. 9 is a flowchart showing another example of the update procedure of the reference information.

FIG. 9 is a flowchart showing another example of the update procedure of the reference information.

The collection unit 104 collects the measured value and the measurement time from each of the plurality of magnetic sensors 20, while the drive control unit 120 controls the movable mechanism 40, to move the movable member 14 with respect to the support member 12 along a predetermined direction at a constant speed, from one end to an opposite end in a predetermined range of movement in the calibration measurement period (S200).

The update unit 108 generates the new reference information, by converting the measured value in accordance with the measurement time of the magnetic sensor 20, into the measured value in accordance with the position of the movable member 14 with respect to the support member 12 (S202). The update unit 108 corrects the measured value in accordance with the position of the magnetic sensor 20 as the correction target, which is indicated by the new reference information, to have a similarity with the measured value in accordance with the position of the magnetic sensor 20 as the reference target (S204). Next, the update unit 108 updates the current reference information by the corrected new reference information (S206).

The above processing corrects the measured value measured by the magnetic sensor 20 in the period during which the movable member 14 moves at a non-constant speed. In this manner, the reference information can be updated with a higher precision. In addition, unlike a case of a rotation, in a case of a position shift, it is difficult to maintain a constant speed in an entire drive section due to a presence of an endpoint. Even in such a case, it is possible to calibrate, with a high precision, the magnetic sensor 20 that detects the position.

Figure 10:
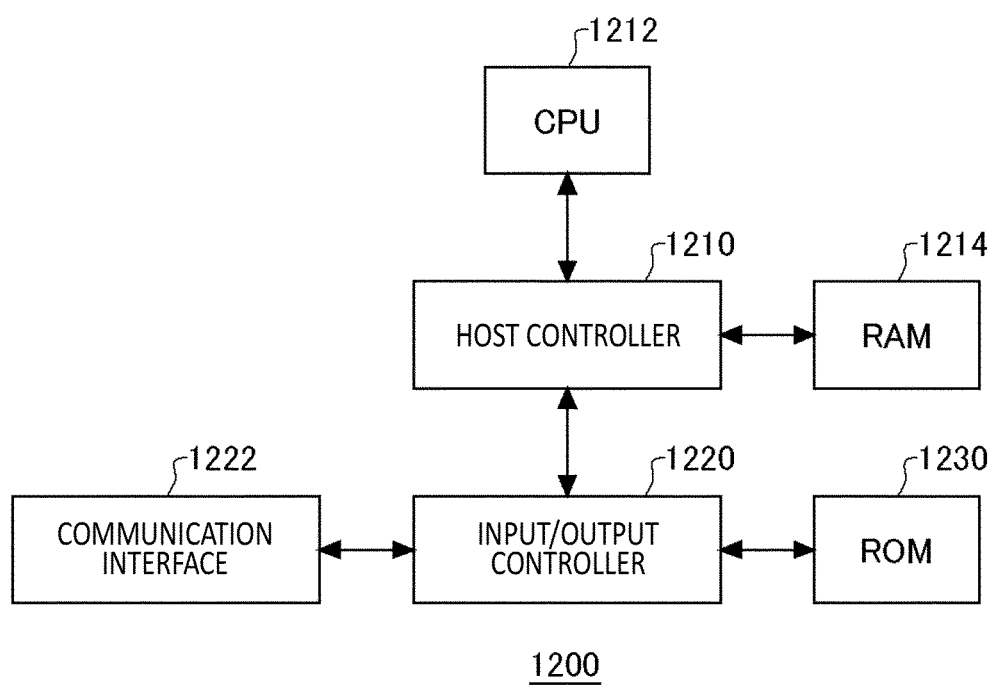
FIG. 10 is a diagram showing an example of a hardware configuration.

FIG. 10 shows an example of a computer 1200 in which a plurality of embodiments of the present invention may be entirely or partially embodied. Programs installed in the computer 1200 can cause the computer 1200 to function as operations associated with the apparatus according to the embodiments of the present invention or one or more "units" of the apparatus. Alternatively, the programs can cause the computer 1200 to execute the operations or the one or more "units". The programs can cause the computer 1200 to execute a process according to the embodiments of the present invention or steps of the process. Such programs may be executed by a CPU 1212 to cause the computer 1200 to perform specific operations associated with some or all of the blocks in the flowcharts and block diagrams described in the present specification.

The computer 1200 according to the present embodiment includes the CPU 1212 and a RAM 1214, which are mutually connected by a host controller 1210. The computer 1200 also includes a communication interface 1222 and an input/output unit, which are connected to the host controller 1210 via an input/output controller 1220. The computer 1200 also includes a ROM 1230. The CPU 1212 operates according to the programs stored in the ROM 1230 and the RAM 1214, thereby controlling each unit.

The communication interface 1222 communicates with other electronic devices via a network. A hard disk drive may store the programs and data used by the CPU 1212 in the computer 1200. The ROM 1230 stores therein boot programs or the like executed by the computer 1200 at the time of activation, and/or stores programs depending on hardware of the computer 1200. The program is provided via a computer-readable storage medium such as a CD-ROM, a USB memory or an IC card or the network. The programs are installed in the RAM 1214 or the ROM 1230, which are also examples of the computer-readable storage medium, and executed by the CPU 1212. Information processing written in these programs is read by the computer 1200, and provides cooperation between the programs and the various types of hardware resources described above. An apparatus or a method may be constituted by implementing operations or processing of information according to a use of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. Under the control of the CPU 1212, the communication interface 1222 reads transmission data stored in a transmission buffer region provided in a storage medium such as the RAM 1214 or the USB memory, transmits the read transmission data to the network, or writes received data which is received from the network to a receiving buffer region or the like provided on the storage medium.

In addition, the CPU 1212 may execute various types of processes on the data on the RAM 1214 such that the RAM 1214 reads all or necessary parts of a file or database stored in an external storage medium such as the USB memory. The CPU 1212 may then write back the processed data to the external storage medium.

Various types of information, such as various types of programs, data, tables, and databases, may be stored in the storage medium to undergo information processing. The CPU 1212 may execute, on the data read from the RAM 1214, various types of processing including various types of operations, information processing, conditional judgment, conditional branching, unconditional branching, information retrieval/replacement, or the like described throughout the present disclosure and specified by instruction sequences of the programs, to write the results back to the RAM 1214. In addition, the CPU 1212 may search for information in a file, a database, etc., in the storage medium. For example, when a plurality of entries, each having an attribute value of a first attribute associated with an attribute value of a second attribute, are stored in the storage medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The programs or software module described above may be stored on the computer 1200 or in a computer-readable storage medium near the computer 1200. In addition, the storage medium such as a hard disk or a RAM provided in a server system connected to a dedicated communication network or the Internet can be used as the computer-readable storage medium, thereby providing the program to the computer 1200 via the network.

A computer-readable medium may include any tangible device that can store instructions to be executed by a suitable device. As a result, the computer-readable medium having instructions stored therein includes an article of manufacture including instructions which can be executed to create means for performing operations specified in the flowcharts or block diagrams. Examples of the computer-readable medium may include an electronic storage medium, a magnetic storage medium, an optical storage medium, an electromagnetic storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc, read-only memory (CD-ROM), a digital versatile disc (DVD), a Blu-ray (registered trademark) disc, a memory stick, an integrated circuit card, and the like.

Computer-readable instructions may include either a source code or an object code written in any combination of one or more programming languages. The source code or the object code includes a conventional procedural programming language. The conventional procedural programming language may be assembler instructions, instruction-set-architecture (ISA) instructions, machine instructions, machine dependent instructions, microcode, firmware instructions, state-setting data, or an object oriented programming language such as Smalltalk (registered trademark), JAVA (registered trademark), C++, etc., and programming languages, such as the "C" programming language or similar programming languages. Computer-readable instructions may be provided to a processor of a general purpose computer, special purpose computer, or other programmable data processing device, or to programmable circuitry, locally or via a local area network (LAN), a wide area network (WAN) such as the Internet, etc. The processor or the programmable circuitry may execute the computer-readable instructions in order to create means for performing operations specified in the flowcharts or block diagrams. An example of the processor includes a computer processor, processing unit, microprocessor, digital signal processor, controller, microcontroller, or the like.

While the present invention has been described with the embodiments, the technical scope of the present invention is not limited to the scope of the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES 10 apparatus
12 support member
14 movable member
20 magnetic sensor
30 magnet unit
40 movable mechanism
50 display screen
100 estimation device
102 estimation unit
104 collection unit
108 update unit
110 storage unit
120 drive control unit
1200 computer
1210 host controller
1212 CPU
1214 RAM
1220 input/output controller
1222 communication interface
1230 ROM.

What is claimed is:

1. An estimation device in an apparatus including a first portion, a second portion, a drive mechanism configured to move the second portion with respect to the first portion along a predetermined direction within a predetermined range of movement, a plurality of magnetic sensors provided in one of the first portion and the second portion along the predetermined direction, and a magnet unit that is provided in the other of the first portion and the second portion and that is configured to provide a magnetic field which is measured by the plurality of magnetic sensors,
  the estimation device being configured to estimate a position of the second portion with respect to the first portion, and comprising:
   an estimation unit configured to estimate the position of the second portion with respect to the first portion at a first point in time, based on a measured value at the first point in time measured by each of the plurality of magnetic sensors, and reference information indicating a combination of a measured value of each of the plurality of magnetic sensors in accordance with the position of the second portion with respect to the first portion in the predetermined range of movement;
   a collection unit configured to collect a measured value which is measured by each of the plurality of magnetic sensors, in a first period during which the drive mechanism is driven to move the second portion with respect to the first portion along the predetermined direction over the predetermined range of movement in a predetermined operation pattern; and
   an update unit configured to generate new reference information based on a measured value in accordance with a time measured in the first period by each of the plurality of magnetic sensors, and update the reference information by the new reference information, wherein
  the update unit is configured to correct the position of the second portion with respect to the first portion or the measured value of a predetermined first magnetic sensor, which is indicated by the new reference information, by comparing a predetermined first partial waveform in a first waveform for the first magnetic sensor among the plurality of magnetic sensors, the first waveform indicating a change of the measured value in accordance with the position of the second portion with respect to the first portion, which is indicated by the new reference information, with a predetermined second partial waveform in a second waveform for a predetermined second magnetic sensor among the plurality of magnetic sensors, the second waveform indicating the change of the measured value in accordance with the position of the second portion with respect to the first portion, which is indicated by the new reference information.

2. The estimation device according to claim 1, wherein the update unit is configured to correct the position of the second portion with respect to the first portion or the measured value of the first magnetic sensor, which is indicated by the new reference information, such that the first partial waveform has a similarity with the second partial waveform.

3. The estimation device according to claim 2, wherein the first magnetic sensor is a magnetic sensor that is provided at one end of the plurality of magnetic sensors in the predetermined direction, and
the second magnetic sensor is a magnetic sensor other than a fourth magnetic sensor that is provided at an opposite end of the plurality of magnetic sensors in the predetermined direction.

4. The estimation device according to claim 3, wherein the first partial waveform is a partial waveform on an outside of a part between a peak of the first waveform, and a peak of a fourth waveform for the fourth magnetic sensor, the fourth waveform indicating the change of the measured value in accordance with the position of the second portion with respect to the first portion, which is indicated by the new reference information.

5. The estimation device according to claim 4, wherein the predetermined operation pattern is a pattern in which the second portion is caused to move with respect to the first portion along the predetermined direction at a constant speed, from one end toward an opposite end in the predetermined range of movement.

6. The estimation device according to claim 1, wherein the update unit is configured to correct the position of the second portion with respect to the first portion or the measured value of a third magnetic sensor, which is indicated by the new reference information, by comparing, in a predetermined range around a peak of a third waveform for the third magnetic sensor among the plurality of magnetic sensors, halves of the third waveform around the peak, the third waveform indicating the change of the measured value in accordance with the position of the second portion with respect to the first portion, which is indicated by the new reference information.

7. The estimation device according to claim 6, wherein the update unit is configured to correct the position of the second portion with respect to the first portion or the measured value of the third magnetic sensor, which is indicated by the new reference information, such that the third waveform is line-symmetrical in the predetermined range around the peak of the third waveform.

8. The estimation device according to claim 1, wherein the update unit is configured to correct the position of the second portion with respect to the first portion or the measured value of a third magnetic sensor, which is indicated by the new reference information, by comparing a third waveform in a predetermined range for the third magnetic sensor among the plurality of magnetic sensors, the third waveform indicating the change of the measured value in accordance with the position of the second portion with respect to the first portion, which is indicated by the new reference information, with a waveform based on a predetermined fit function indicating the change of the measured value in accordance with the position of the second portion with respect to the first portion.

9. The estimation device according to claim 8, wherein the update unit is configured to correct the position of the second portion with respect to the first portion or the measured value of the third magnetic sensor, which is indicated by the new reference information, such that the third waveform in the predetermined range for the third magnetic sensor among the plurality of magnetic sensors, the third waveform indicating the change of the measured value in accordance with the position of the second portion with respect to the first portion, which is indicated by the new reference information, matches the waveform based on the predetermined fit function indicating the change of the measured value in accordance with the position of the second portion with respect to the first portion.

10. An apparatus comprising:
the estimation device according to claim 1;
the first portion;
the second portion; and
the drive mechanism.

11. An estimation device in an apparatus including a first portion, a second portion, a drive mechanism configured to move the second portion with respect to the first portion along a predetermined direction within a predetermined range of movement, a plurality of magnetic sensors provided in one of the first portion and the second portion along the predetermined direction, and a magnet unit that is provided in the other of the first portion and the second portion and that is configured to provide a magnetic field which is measured by the plurality of magnetic sensors, the estimation device being configured to estimate a position of the second portion with respect to the first portion, and comprising:
an estimation unit configured to estimate the position of the second portion with respect to the first portion at a first point in time, based on a measured value at the first point in time measured by each of the plurality of magnetic sensors, and reference information indicating a combination of a measured value of each of the plurality of magnetic sensors in accordance with the position of the second portion with respect to the first portion in the predetermined range of movement;
a collection unit configured to collect a measured value which is measured by each of the plurality of magnetic sensors, in a first period during which the drive mechanism is driven to move the second portion with respect to the first portion along the predetermined direction over the predetermined range of movement in a predetermined operation pattern; and
an update unit configured to generate new reference information based on a measured value in accordance with a time measured in the first period by each of the plurality of magnetic sensors, and update the reference information by the new reference information, wherein
the update unit is configured to correct a measured value in accordance with a time measured in the first period by a predetermined first magnetic sensor, and then generate the new reference information, by comparing a predetermined first partial waveform in a first waveform indicating a change of the measured value in accordance with the time measured in the first period by the first magnetic sensor among the plurality of magnetic sensors, with a predetermined second partial waveform in a second waveform indicating a change of a measured value in accordance with a time measured in the first period by a predetermined second magnetic sensor among the plurality of magnetic sensors.

12. The estimation device according to claim 11, wherein the update unit is configured to correct the measured value in accordance with the time measured in the first period by the first magnetic sensor such that the first partial waveform has a similarity with the second partial waveform.

13. The estimation device according to claim 12, wherein the update unit is configured to correct a measured value in accordance with a time measured in the first period by a third magnetic sensor, by comparing, when a third waveform is line-symmetrical in a first range around a peak of the third waveform, halves of the third waveform around the peak in a second range which is wider than the first range around the peak of the third waveform, the third waveform indicating a change of the measured value in accordance with the time measured in the first period by the third magnetic sensor among the plurality of magnetic sensors.

14. The estimation device according to claim 13, wherein the update unit is configured to correct the measured value in accordance with the time measured in the first period by the third magnetic sensor, such that the third waveform is line-symmetrical in the second range, when the third waveform is line-symmetrical in the first range around the peak of the third waveform.

15. The estimation device according to claim 12, wherein the first magnetic sensor is a magnetic sensor that is provided at one end of the plurality of magnetic sensors in the predetermined direction, and the second magnetic sensor is a magnetic sensor other than a fourth magnetic sensor that is provided at an opposite end of the plurality of magnetic sensors in the predetermined direction.

16. The estimation device according to claim 15, wherein the first partial waveform is a partial waveform on an outside of a part between a peak of the first waveform, and a peak of a fourth waveform indicating a change of a measured value in accordance with a time measured in the first period by the fourth magnetic sensor.

17. The estimation device according to claim 12, wherein the predetermined operation pattern is a pattern in which the second portion is caused to move with respect to the first portion along the predetermined direction at a constant speed, from one end toward an opposite end in the predetermined range of movement.

18. An estimation method in an apparatus including a first portion, a second portion, a drive mechanism configured to move the second portion with respect to the first portion along a predetermined direction within a predetermined range of movement, a plurality of magnetic sensors provided in one of the first portion and the second portion along the predetermined direction, and a magnet unit that is provided in the other of the first portion and the second portion and that is configured to provide a magnetic field which is measured by the plurality of magnetic sensors, the estimation method being for estimating a position of the second portion with respect to the first portion, and comprising:

estimating the position of the second portion with respect to the first portion at a first point in time, based on a measured value at the first point in time measured by each of the plurality of magnetic sensors, and reference information indicating a combination of a measured value of each of the plurality of magnetic sensors in accordance with the position of the second portion with respect to the first portion in the predetermined range of movement;

collecting a measured value which is measured by each of the plurality of magnetic sensors, in a first period during which the drive mechanism is driven to move the second portion with respect to the first portion along the predetermined direction over the predetermined range of movement in a predetermined operation pattern; and generating new reference information based on a measured value in accordance with a time measured in the first period by each of the plurality of magnetic sensors, and updating the reference information by the new reference information, wherein the updating includes correcting the position of the second portion with respect to the first portion or the measured value of a predetermined first magnetic sensor, which is indicated by the new reference information, by comparing a predetermined first partial waveform in a first waveform for the first magnetic sensor among the plurality of magnetic sensors, the first waveform indicating a change of the measured value in accordance with the position of the second portion with respect to the first portion, which is indicated by the new reference information, with a predetermined second partial waveform in a second waveform for a predetermined second magnetic sensor among the plurality of magnetic sensors, the second waveform indicating the change of the measured value in accordance with the position of the second portion with respect to the first portion, which is indicated by the new reference information.

19. An estimation method in an apparatus including a first portion, a second portion, a drive mechanism configured to move the second portion with respect to the first portion along a predetermined direction within a predetermined range of movement, a plurality of magnetic sensors provided in one of the first portion and the second portion along the predetermined direction, and a magnet unit that is provided in the other of the first portion and the second portion and that is configured to provide a magnetic field which is measured by the plurality of magnetic sensors, the estimation method being for estimating a position of the second portion with respect to the first portion, and comprising:

estimating the position of the second portion with respect to the first portion at a first point in time, based on a measured value at the first point in time measured by each of the plurality of magnetic sensors, and reference information indicating a combination of a measured value of each of the plurality of magnetic sensors in accordance with the position of the second portion with respect to the first portion in the predetermined range of movement;

collecting a measured value which is measured by each of the plurality of magnetic sensors, in a first period during which the drive mechanism is driven to move the second portion with respect to the first portion along the predetermined direction over the predetermined range of movement in a predetermined operation pattern; and generating new reference information based on a measured value in accordance with a time measured in the first period by each of the plurality of magnetic sensors, and updating the reference information by the new reference information, wherein the updating includes correcting a measured value in accordance with a time measured in the first period by a predetermined first magnetic sensor, and then generating the new reference information, by comparing a predetermined first partial waveform in a first waveform indicating a change of the measured value in accordance with the time measured in the first period by the first magnetic sensor among the plurality of magnetic sensors, with a predetermined second partial waveform in a second waveform indicating a change of a measured value in accordance with a time measured in the first period by a predetermined second magnetic sensor among the plurality of magnetic sensors.

20. A non-transitory computer-readable medium that is configured to store a program for causing a computer to function as an estimation device in an apparatus including a first portion, a second portion, a drive mechanism configured to move the second portion with respect to the first portion along a predetermined direction within a predetermined range of movement, a plurality of magnetic sensors provided in one of the first portion and the second portion along the predetermined direction, and a magnet unit that is provided in the other of the first portion and the second portion and that is configured to provide a magnetic field which is measured by the plurality of magnetic sensors, the estimation device being configured to estimate a position of the second portion with respect to the first portion, the program causing the computer to execute:

estimating the position of the second portion with respect to the first portion at a first point in time, based on a measured value at the first point in time measured by each of the plurality of magnetic sensors, and reference information indicating a combination of a measured value of each of the plurality of magnetic sensors in accordance with the position of the second portion with respect to the first portion in the predetermined range of movement;

collecting a measured value which is measured by each of the plurality of magnetic sensors, in a first period during which the drive mechanism is driven to move the second portion with respect to the first portion along the predetermined direction over the predetermined range of movement in a predetermined operation pattern; and generating new reference information based on a measured value in accordance with a time measured in the first period by each of the plurality of magnetic sensors, and updating the reference information by the new reference information, wherein the updating includes correcting the position of the second portion with respect to the first portion or the measured value of a predetermined first magnetic sensor, which is indicated by the new reference information, by comparing a predetermined first partial waveform in a first waveform for the first magnetic sensor among the plurality of magnetic sensors, the first waveform indicating a change of the measured value in accordance with the position of the second portion with respect to the first portion, which is indicated by the new reference information, with a predetermined second partial waveform in a second waveform for a predetermined second magnetic sensor among the plurality of magnetic sensors, the second waveform indicating the change of the measured value in accordance with the position of the second portion with respect to the first portion, which is indicated by the new reference information.

21. A non-transitory computer-readable medium that is configured to store a program for causing a computer to function as an estimation device in an apparatus including a first portion, a second portion, a drive mechanism configured to move the second portion with respect to the first portion along a predetermined direction within a predetermined range of movement, a plurality of magnetic sensors provided in one of the first portion and the second portion along the predetermined direction, and a magnet unit that is provided in the other of the first portion and the second portion and that is configured to provide a magnetic field which is measured by the plurality of magnetic sensors, the estimation device being configured to estimate a position of the second portion with respect to the first portion, the program causing the computer to execute:

estimating the position of the second portion with respect to the first portion at a first point in time, based on a measured value at the first point in time measured by each of the plurality of magnetic sensors, and reference information indicating a combination of a measured value of each of the plurality of magnetic sensors in accordance with the position of the second portion with respect to the first portion in the predetermined range of movement;

collecting a measured value which is measured by each of the plurality of magnetic sensors, in a first period during which the drive mechanism is driven to move the second portion with respect to the first portion along the predetermined direction over the predetermined range of movement in a predetermined operation pattern; and generating new reference information based on a measured value in accordance with a time measured in the first period by each of the plurality of magnetic sensors, and updating the reference information by the new reference information, wherein the updating includes correcting a measured value in accordance with a time measured in the first period by a predetermined first magnetic sensor, and then generating the new reference information, by comparing a predetermined first partial waveform in a first waveform indicating a change of the measured value in accordance with the time measured in the first period by the first magnetic sensor among the plurality of magnetic sensors, with a predetermined second partial waveform in a second waveform indicating a change of a measured value in accordance with a time measured in the first period by a predetermined second magnetic sensor among the plurality of magnetic sensors.

* * * * *